US012129698B2

(12) United States Patent
Isono et al.

(10) Patent No.: US 12,129,698 B2
(45) Date of Patent: Oct. 29, 2024

(54) SLIDING DOOR DRIVING DEVICE

(71) Applicant: AISIN CORPORATION, Kariya (JP)

(72) Inventors: Taishi Isono, Kariya (JP); Akinori Suzuki, Kariya (JP); Wataru Kuga, Ikeda (JP); Yuki Ide, Ikeda (JP); Kouhei Hama, Ikeda (JP); Hiroshi Fujishita, Ikeda (JP); Seiichi Harai, Ikeda (JP)

(73) Assignee: AISIN CORPORATION, Kariya (JP)

( * ) Notice: Subject to any disclaimer, the term of this patent is extended or adjusted under 35 U.S.C. 154(b) by 0 days.

(21) Appl. No.: 18/152,203

(22) Filed: Jan. 10, 2023

(65) Prior Publication Data

US 2023/0313581 A1 Oct. 5, 2023

(30) Foreign Application Priority Data

Mar. 30, 2022 (JP) ................................ 2022-056035

(51) Int. Cl.
*E05D 15/10* (2006.01)
*E05F 15/643* (2015.01)

(52) U.S. Cl.
CPC ........ *E05D 15/1047* (2013.01); *E05F 15/643* (2015.01); *E05Y 2201/11* (2013.01); *E05Y 2201/652* (2013.01); *E05Y 2201/668* (2013.01); *E05Y 2201/684* (2013.01); *E05Y 2800/428* (2013.01); *E05Y 2900/531* (2013.01)

(58) Field of Classification Search
CPC .............. E05D 15/1047; E05D 15/643; E05Y 2201/11; E05Y 2201/652; E05Y 2201/668; E05Y 2201/684; E05Y 2800/428; E05Y 2900/531
USPC ............................................................ 49/360
See application file for complete search history.

(56) References Cited

U.S. PATENT DOCUMENTS

| | | | | |
|---|---|---|---|---|
| 5,323,570 A * | 6/1994 | Kuhlman | E05F 15/646 49/138 |
| 5,906,071 A * | 5/1999 | Buchanan, Jr. | B60J 5/06 49/214 |
| 11,598,140 B2 * | 3/2023 | Isono | E05F 15/643 |
| 2006/0113821 A1 * | 6/2006 | Yokomori | B60J 5/06 296/155 |

(Continued)

FOREIGN PATENT DOCUMENTS

| | | | |
|---|---|---|---|
| CN | 111734251 A * | 10/2020 | |
| JP | 2009127290 A * | 6/2009 | E05F 15/646 |
| JP | 2019-100081 A | 6/2019 | |

*Primary Examiner* — Jerry E Redman
(74) *Attorney, Agent, or Firm* — Oblon, McClelland, Maier & Neustadt, L.L.P.

(57) ABSTRACT

A sliding door driving device is fixed to a body panel of a vehicle and operates a sliding door of the vehicle in an opening direction and a closing direction. The sliding door driving device includes an elongated guide frame, a first driven pulley and a second driven pulley that are rotatably supported at both ends in a longitudinal direction of the guide frame, a belt that is wound around the first driven pulley and the second driven pulley, and a cover that covers the belt. The cover has an upper wall that covers the belt from above, an outer wall that extends downward from an outer end of the upper wall in a width direction of the vehicle, and an inner wall that extends downward from an inner end of the upper wall in the width direction.

13 Claims, 7 Drawing Sheets

(56) References Cited

U.S. PATENT DOCUMENTS

| | | | | |
|---|---|---|---|---|
| 2008/0256869 | A1* | 10/2008 | Nixon | E05F 3/227<br>49/506 |
| 2010/0199567 | A1* | 8/2010 | Ishida | E05F 15/646<br>49/360 |
| 2017/0210209 | A1* | 7/2017 | Tsubaki | E05F 15/60 |
| 2021/0277700 | A1* | 9/2021 | Isono | E05F 15/655 |
| 2021/0277701 | A1* | 9/2021 | Isono | B60J 5/06 |
| 2022/0316256 | A1* | 10/2022 | Shibayama | E05D 15/1042 |
| 2022/0388378 | A1* | 12/2022 | Suzuki | B60J 5/06 |
| 2023/0191883 | A1* | 6/2023 | Kume | E05F 15/649<br>16/336 |
| 2023/0313581 | A1* | 10/2023 | Isono | E05D 15/1047<br>49/360 |

* cited by examiner

SLIDING DOOR DRIVING DEVICE

CROSS REFERENCE TO RELATED APPLICATIONS

This application is based on and claims priority under 35 U.S.C. § 119 to Japanese Patent Application 2022-056035, filed on Mar. 30, 2022, the entire content of which is incorporated herein by reference.

TECHNICAL FIELD

This disclosure relates to a sliding door driving device.

BACKGROUND DISCUSSION

JP 2019-100081A (Reference 1) describes a sliding door driving device that opens and closes a sliding door along a guide rail fixed to a body panel of a vehicle. The sliding door driving device includes a belt guide unit that extends along the guide rail, two timing pulleys that are provided at a front end and a rear end of the belt guide unit, respectively, a belt that is wound around the two timing pulleys, and a belt driving unit that drives the belt.

Since the sliding door driving device as described above is installed on the body panel of the vehicle, a liquid such as rain water and cleaning water may adhere to components of the sliding door driving device. When the vehicle is placed in a low-temperature environment in a state in which the liquid adheres to the components of the sliding door driving device, the belt may freeze in a state in which the belt is in contact with the belt guide unit or the like. In this case, the sliding door driving device may not be able to open and close the sliding door.

SUMMARY

According to an aspect of this disclosure, a sliding door driving device that is fixed to a body panel of a vehicle and operates a sliding door of the vehicle in an opening direction and a closing direction includes: an elongated guide frame; a first driven pulley and a second driven pulley that are rotatably supported at both ends in a longitudinal direction of the guide frame; a belt that is wound around the first driven pulley and the second driven pulley; and a cover that covers the belt. The cover has an upper wall that covers the belt from above, an outer wall that extends downward from an outer end of the upper wall in a width direction of the vehicle, and an inner wall that extends downward from an inner end of the upper wall in the width direction.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an embodiment of a vehicle including a sliding door driving device (hereinafter, also referred to as a "door driving device") will be described.

Configuration of the Present Embodiment

Figure 1:
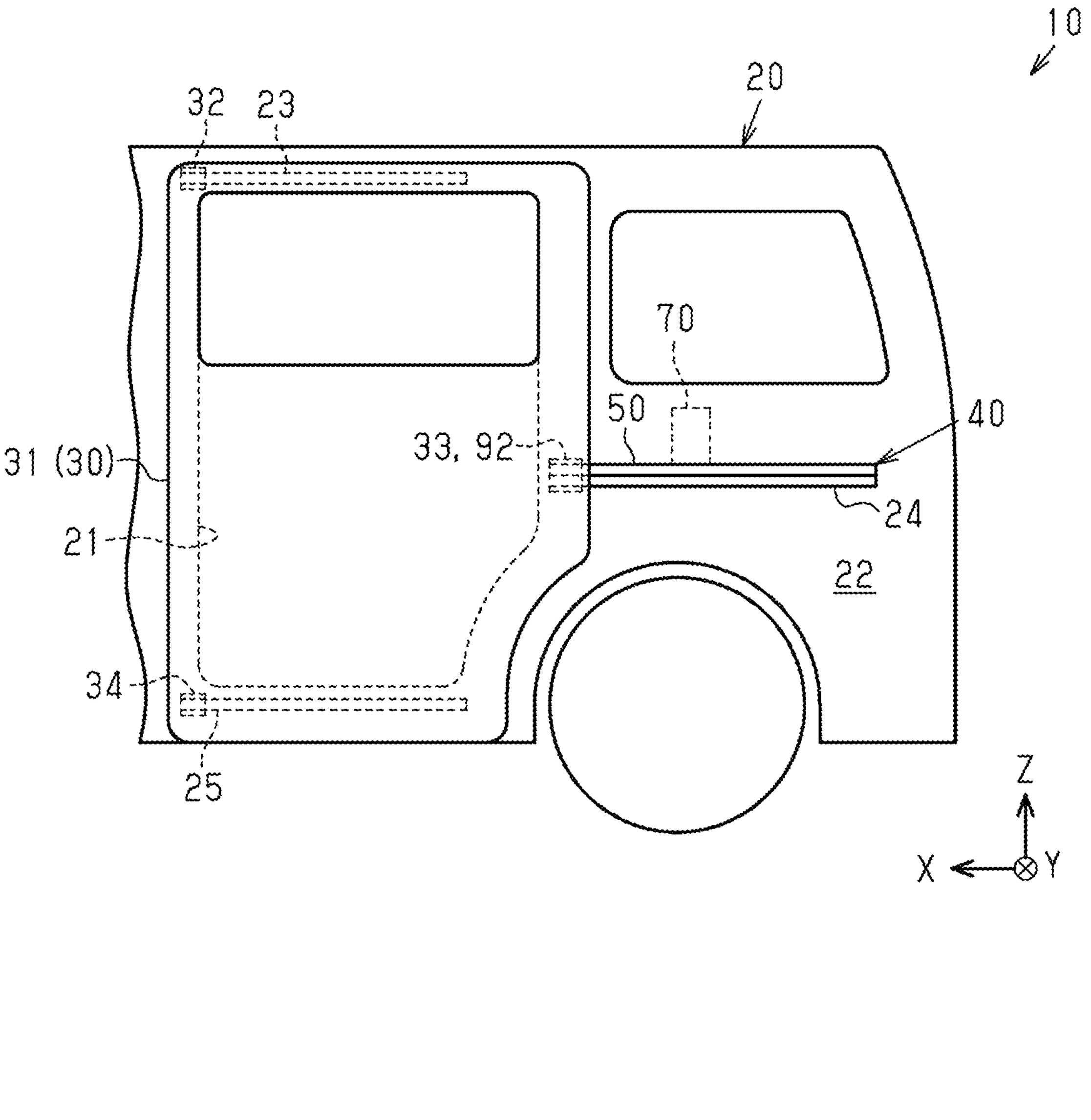
FIG. 1 is a side view showing a schematic configuration of a vehicle.

As shown in FIG. 1, a vehicle 10 includes a vehicle body 20, a sliding door 30, and a door driving device 40. In the following description, a width direction of the vehicle 10 is also referred to as a "width direction", a front-rear direction of the vehicle 10 is also referred to as a "front-rear direction", and an upper-lower direction of the vehicle 10 is also referred to as an "upper-lower direction". In the width direction, a direction toward a center of the vehicle 10 is referred to as "inward", and a direction opposite to the "inward" is referred to as "outward". In a part of drawings, an axis extending in the front-rear direction is indicated by an X axis, an axis extending in the width direction is indicated by a Y axis, and an axis extending in the upper-lower direction is indicated by a Z axis.

<Vehicle Body 20>

Figure 2:
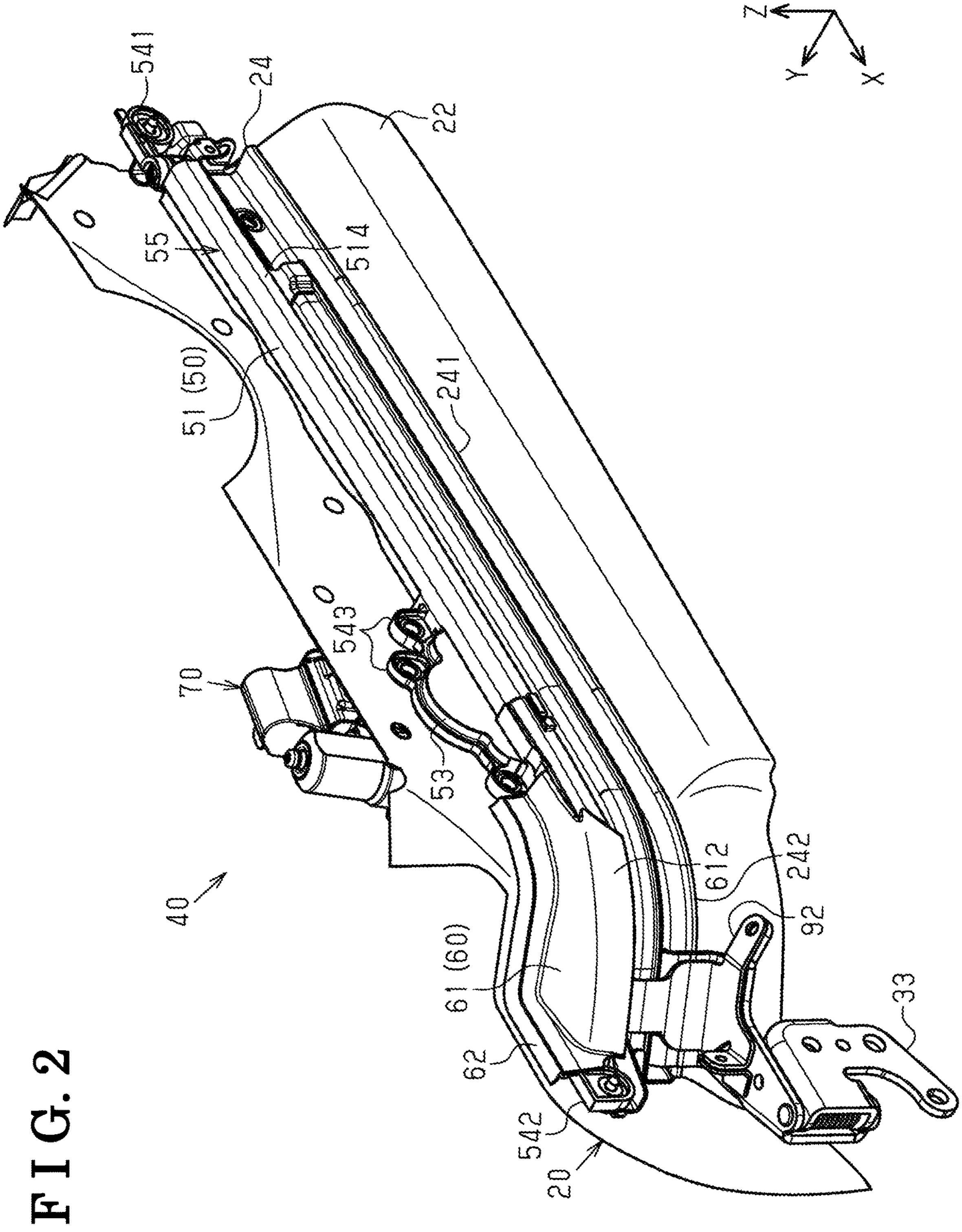
FIG. 2 is a perspective view of a portion of the vehicle behind a door opening.

As shown in FIGS. 1 and 2, the vehicle body 20 includes a door opening 21, a body panel 22, an upper rail 23, a center rail 24, and a lower rail 25.

As shown in FIG. 1, the door opening 21 is opened in a side surface of the vehicle body 20. The door opening 21 has a rectangular shape in a side view in the width direction. The door opening 21 is a portion through which a user of the vehicle 10 passes when getting on and off the vehicle 10. The body panel 22 is a side body panel forming the side surface of the vehicle body 20. As shown in FIG. 2, a portion of the body panel 22 where the center rail 24 and the door driving device 40 are assembled is recessed inward in the width direction. Although hidden in the door driving device 40, the body panel 22 has a through hole through which a part of components of the door driving device 40 pass in the width direction.

As shown in FIG. 1, the upper rail 23, the center rail 24, and the lower rail 25 are fixed to the side surface of the vehicle body 20. The upper rail 23 is located above the door opening 21. The center rail 24 is located behind the door opening 21. The lower rail 25 is located below the door opening 21. In the upper-lower direction, the upper rail 23 is located above the center rail 24 and the lower rail 25, and the center rail 24 is located between the upper rail 23 and the lower rail 25. The upper rail 23, the center rail 24, and the lower rail 25 are members for defining an opening and closing direction of the sliding door 30.

As shown in FIG. 2, the center rail 24 includes a linear portion 241 that extends forward and a curved portion 242 that extends from a front end of the linear portion 241 in an arc shape inward in the width direction as advancing forward. The linear portion 241 does not need to extend linearly all throughout, and may be slightly curved with a small curvature. Similarly, the curved portion 242 does not need to be curved all throughout, and may have a linearly extending portion. Although not shown, the upper rail 23 and the lower rail 25 also include configurations corresponding to the linear portion 241 and the curved portion 242 of the center rail 24. Therefore, the upper rail 23, the center rail 24, and the lower rail 25 are curved such that front ends are located more inward than rear ends of the upper rail 23, the center rail 24, and the lower rail 25 in the width direction. Since the upper rail 23, the center rail 24, and the lower rail 25 are curved, the sliding door 30 can be moved in the width direction in a vicinity of a fully closed position.

<Sliding Door 30>

As shown in FIG. 1, the sliding door 30 includes a door body 31, an upper hinge unit 32, a center hinge unit 33, and a lower hinge unit 34.

The door body 31 has a shape corresponding to the door opening 21. The upper hinge unit 32, the center hinge unit 33, and the lower hinge unit 34 are fixed to the door body 31. The upper hinge unit 32 is located at a front end and at an upper portion of the door body 31. The center hinge unit 33 is located at a rear end and at a central portion in the upper-lower direction of the door body 31. The lower hinge unit 34 is located at the front end and at a lower portion of the door body 31. The upper hinge unit 32 is engaged with the upper rail 23 so as to be movable along the upper rail 23. The center hinge unit 33 is engaged with the center rail 24 so as to be movable along the center rail 24. The lower hinge unit 34 is engaged with the lower rail 25 so as to be movable along the lower rail 25.

The upper hinge unit 32, the center hinge unit 33, and the lower hinge unit 34 move with respect to the upper rail 23, the center rail 24, and the lower rail 25, respectively, so that the sliding door 30 slides in the opening and closing direction. Specifically, the sliding door 30 slides between the fully closed position in which the door opening 21 is fully closed and a fully open position in which the door opening 21 is fully opened. In the present embodiment, the sliding door 30 is moved rearward to open, and the sliding door 30 is moved forward to close. That is, an opening direction of the sliding door 30 is rearward, and a closing direction of the sliding door 30 is forward.

<Door Driving Device 40>

As shown in FIG. 2, the door driving device 40 is fixed to the body panel 22. At this time, the door driving device 40 is aligned with the center rail 24 in the upper-lower direction. Specifically, the door driving device 40 is located directly above the center rail 24.

Figure 3:
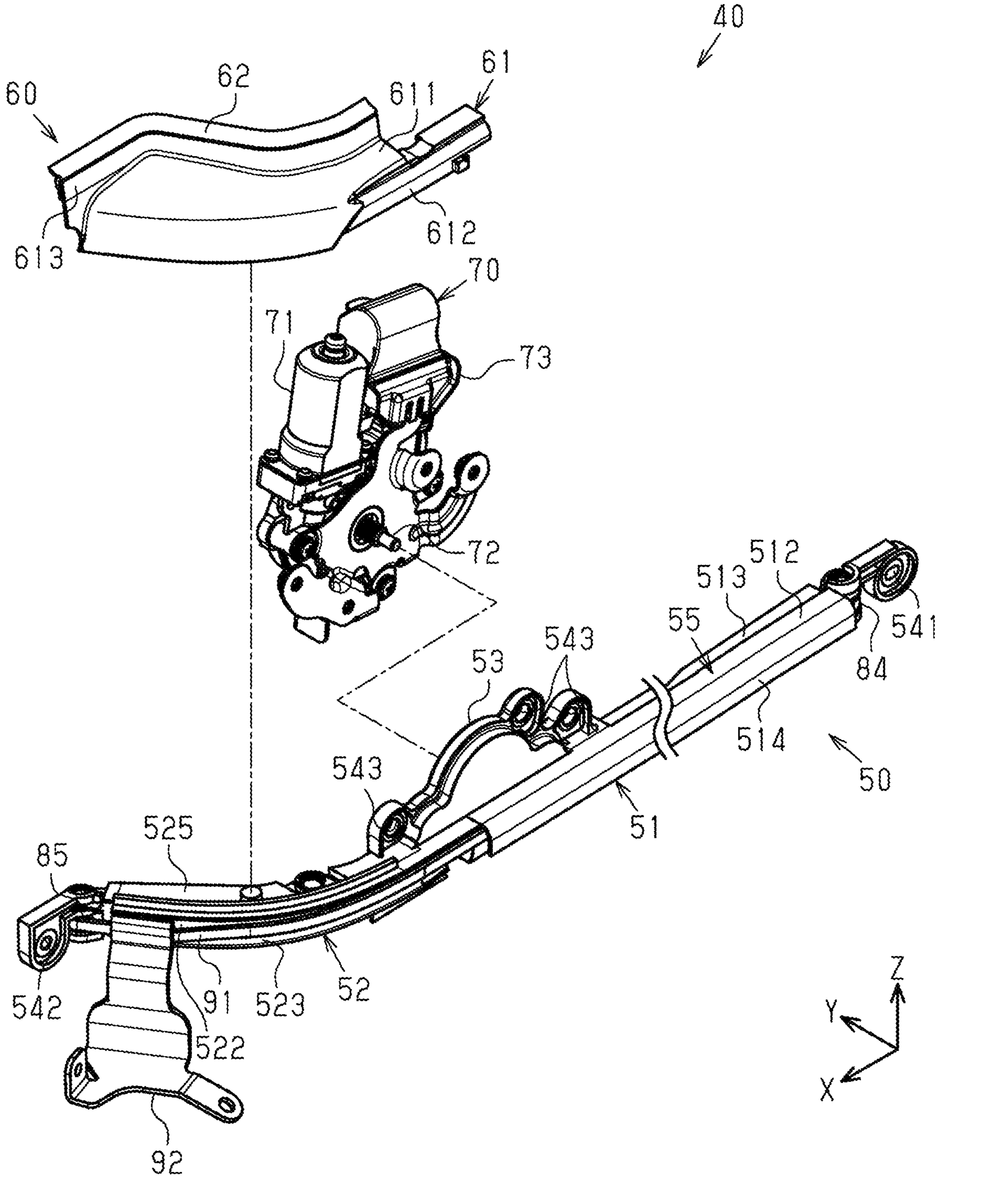
FIG. 3 is a perspective view of a sliding door driving device.
Figure 4:
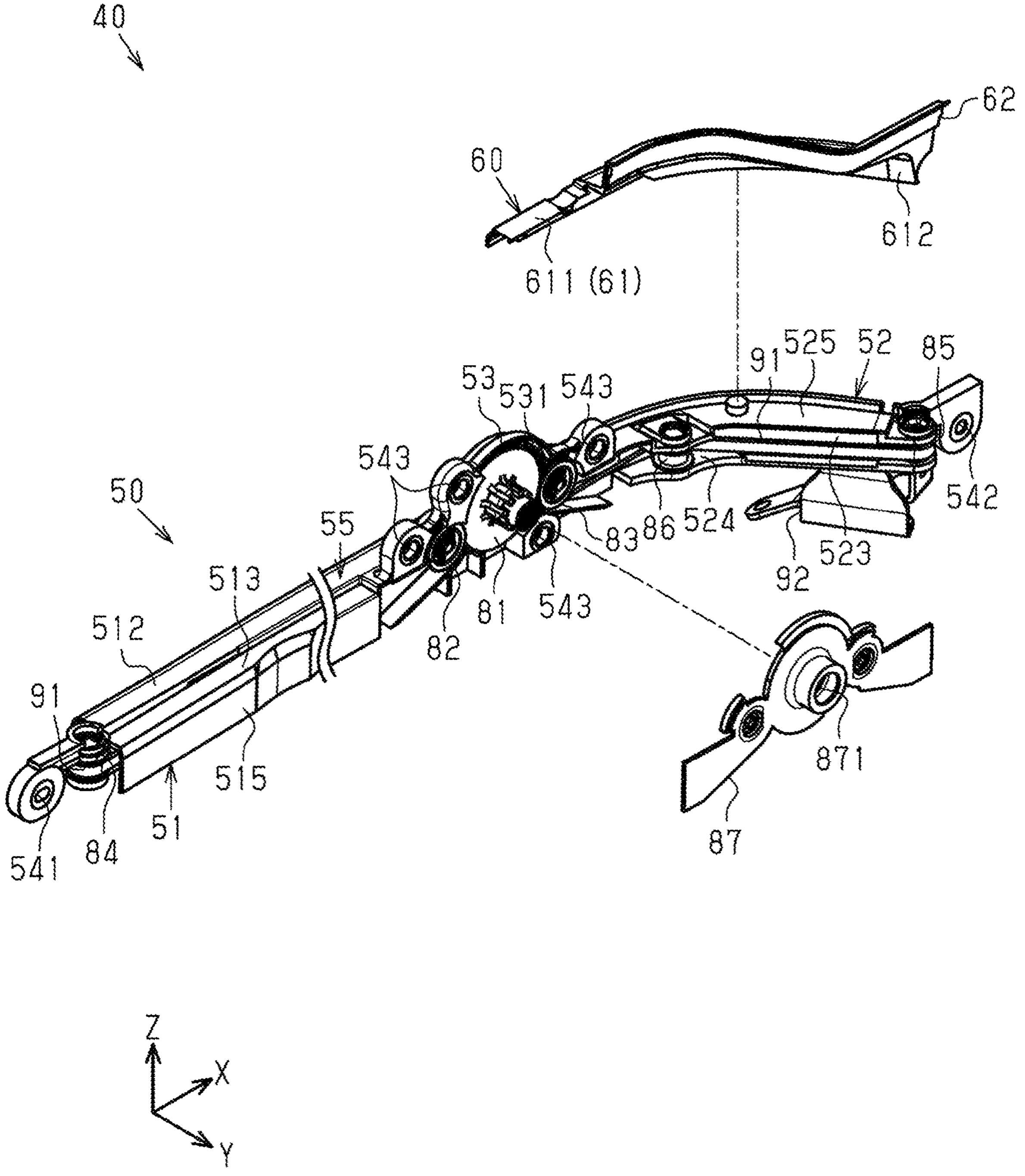
FIG. 4 is a perspective view of the sliding door driving device.

As shown in FIGS. 3 and 4, the door driving device 40 includes a guide frame 50, a sub-cover 60, a belt driving unit 70, a driving pulley 81, two pressing pulleys 82 and 83, three driven pulleys 84 to 86, a pulley cover 87, a belt 91, and a belt bracket 92.

The guide frame 50 is elongated in the same manner as the center rail 24. That is, the guide frame 50 is curved such that a front end is located more inward than a rear end of guide frame 50 in the width direction when the guide frame 50 is fixed to the vehicle body 20. Regarding the opening and closing direction of the sliding door 30, the front end of the guide frame 50 is an end in the closing direction, and the rear end of the guide frame 50 is an end in the opening direction.

The guide frame 50 includes a linear portion 51 having a linear shape in a plan view, a curved portion 52 having an arc shape in the plan view, an accommodation portion 53 accommodating a part of components of the door driving device 40, and a plurality of fixing holes 541 to 543 each fixed to the body panel 22. In the present embodiment, the guide frame 50 is a molded product made of a resin material. The linear portion 51 of the guide frame 50 is a portion formed by a mold that is released mainly in the upper-lower direction. On the other hand, the curved portion 52 and the accommodation portion 53 of the guide frame 50 are portions formed by a mold that is released mainly in the width direction.

Figure 5:
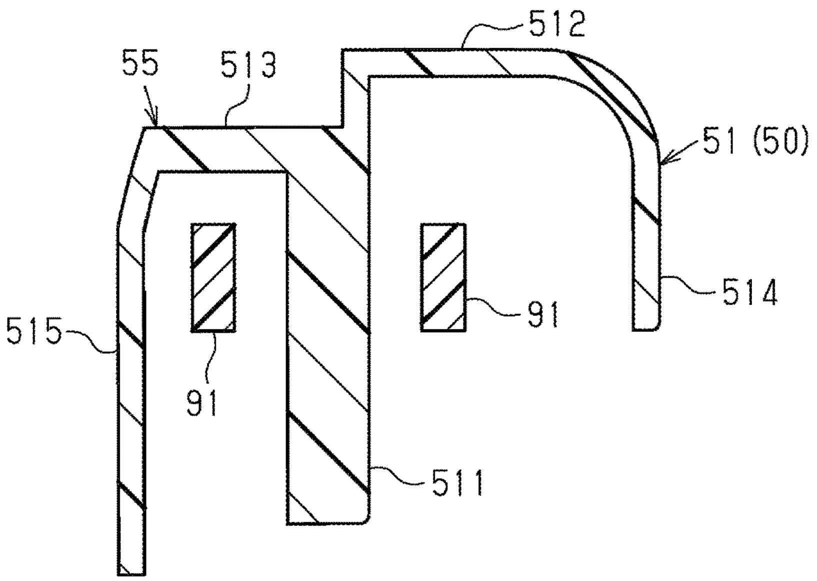
FIG. 5 is an end view of the sliding door driving device orthogonal to a linear portion of a guide frame.

As shown in FIGS. 3 to 5, the linear portion 51 constitutes a rear portion of the guide frame 50. The linear portion 51 does not need to extend linearly without being curved at all, and may be gently curved. The linear portion 51 has a guide wall 511, an outer upper wall 512, an inner upper wall 513, an outer wall 514, and an inner wall 515. FIG. 5 is a cross-sectional view of the door driving device 40 orthogonal to a longitudinal direction of the linear portion 51 of the guide frame 50.

The guide wall 511 is an elongated member extending in the same manner as the linear portion 241 of the center rail 24. A cross-sectional shape orthogonal to the longitudinal direction of the guide wall 511 is a rectangular shape whose width direction is a lateral direction and an upper-lower direction is a longitudinal direction. The outer upper wall 512 extends outward in the width direction from the guide wall 511, and the inner upper wall 513 extends inward in the width direction from the guide wall 511. The outer upper wall 512 extends from an upper end of the guide wall 511, whereas the inner upper wall 513 extends from a position lower than the upper end of the guide wall 511. Therefore, in the present embodiment, the outer upper wall 512 is located above the inner upper wall 513. In other embodiments, the outer upper wall 512 and the inner upper wall 513 may be located at the same height, or the outer upper wall 512 may be located lower than the inner upper wall 513.

The outer wall 514 extends downward from an outer end of the outer upper wall 512 in the width direction, and the inner wall 515 extends downward from an inner end of the inner upper wall 513 in the width direction. The outer wall 514 faces an outer surface of the guide wall 511, and the inner wall 515 faces an inner surface of the guide wall 511. A lower end of the inner wall 515 is located below a lower end of the outer wall 514. In the linear portion 51, a space surrounded by the guide wall 511, the outer upper wall 512, and the outer wall 514 and a space surrounded by the guide wall 511, the inner upper wall 513, and the inner wall 515 are spaces in which the belt 91 is routed.

In the present embodiment, a "main cover 55" includes the outer upper wall 512, the inner upper wall 513, the outer wall 514, and the inner wall 515 of the linear portion 51 of the guide frame 50. That is, the main cover 55 of the present embodiment is formed integrally with the guide frame 50. The outer upper wall 512 and the inner upper wall 513 correspond to "an upper wall of the main cover 55".

Figure 6:
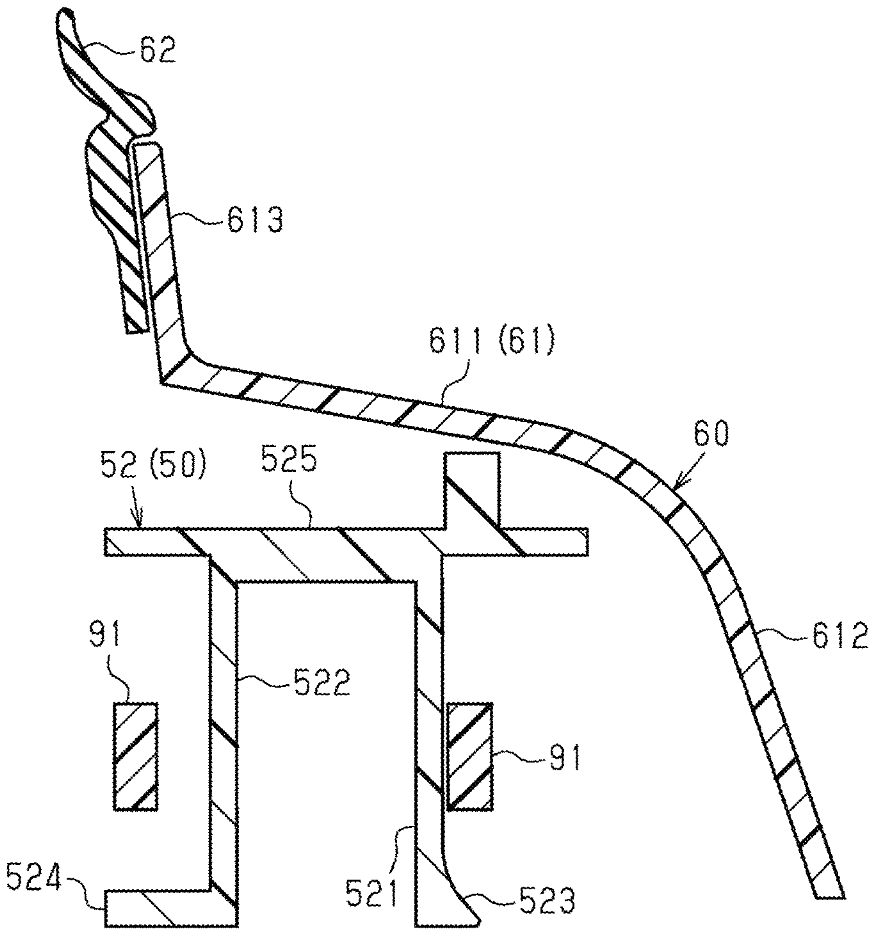
FIG. 6 is an end view of the sliding door driving device orthogonal to a curved portion of the guide frame.

As shown in FIGS. 3, 4 and 6, the curved portion 52 constitutes a front portion of the guide frame 50. The curved portion 52 extends from the front end of the linear portion 51 in an arc shape inward in the width direction as advancing forward. The curved portion 52 does not need to include only a portion having an arc shape, and may have a linearly extending portion. The curved portion 52 has an outer guide wall 521, an inner guide wall 522, an outer bottom wall 523, an inner bottom wall 524, and an upper wall 525. FIG. 6 is a cross-sectional view of the door driving device 40 orthogonal to a longitudinal direction of the curved portion 52 of the guide frame 50.

The outer guide wall 521 and the inner guide wall 522 are elongated members extending in the same manner as the curved portion 242 of the center rail 24 with a gap therebetween. The outer guide wall 521 is located more outward than the inner guide wall 522 in the width direction. A cross-sectional shape orthogonal to longitudinal directions of the outer guide wall 521 and the inner guide wall 522 is a rectangular shape whose width direction is a lateral direction and an upper-lower direction is a longitudinal direction. When the outer guide wall 521 and the inner guide wall 522 are formed integrally as one guide wall, sink marks may occur during resin molding. Therefore, a gap is provided between the outer guide wall 521 and the inner guide wall 522. That is, when the gap between the outer guide wall 521 and the inner guide wall 522 is narrow, the outer guide wall 521 and the inner guide wall 522 can be formed integrally.

The outer bottom wall 523 extends from a lower end of the outer guide wall 521 outward in the width direction. Specifically, the outer bottom wall 523 extends in a direction opposite to a direction from the outer guide wall 521 toward the inner guide wall 522. A thickness of the outer bottom wall 523 in the upper-lower direction gradually decreases as the outer bottom wall 523 extends from the outer guide wall 521. In other words, the outer bottom wall 523 is tapered. Thus, an upper surface of the outer bottom wall 523 is continuously connected to an outer surface of the outer guide wall 521. The inner bottom wall 524 extends outward in the width direction from the lower end of the outer guide wall 521. Specifically, the inner bottom wall 524 extends in the direction opposite to the direction from the outer guide wall 521 toward the inner guide wall 522. The inner bottom wall 524 does not change in thickness in the upper-lower direction as the inner bottom wall 524 extends from the outer guide wall 521.

The upper wall 525 is connected to an upper end of the outer guide wall 521 and an upper end of the inner guide wall 522. The upper wall 525 extends outward in the width direction with respect to the upper end of the outer guide wall 521, and extends inward in the width direction with respect to the upper end of the inner guide wall 522. The upper wall 525 faces the inner bottom wall 524 and the outer bottom wall 523 in the upper-lower direction.

In the guide frame 50 described above, the guide wall 511 of the linear portion 51 and the outer guide wall 521 and the inner guide wall 522 of the curved portion 52 guide the belt 91 that operates along the linear portion 51 and the curved portion 52. The outer upper wall 512 and the inner upper wall 513 of the linear portion 51 and the upper wall 525 of the curved portion 52 protect the belt 91 routed along the linear portion 51 and the curved portion 52 from above. The inner bottom wall 524 and the outer bottom wall 523 of the curved portion 52 prevent the belt 91 routed along the curved portion 52 from dropping downward.

As shown in FIGS. 3 and 4, the accommodation portion 53 is formed integrally with a front end of the linear portion 51 and a rear end of the curved portion 52. A surface of the accommodation portion 53 facing the body panel 22 has an opening. The accommodation portion 53 has an accommodation space 531 that accommodates the driving pulley 81 and the two pressing pulleys 82 and 83.

The plurality of fixing holes 541 to 543 are provided at intervals in a longitudinal direction of the guide frame 50. Specifically, the fixing hole 541 is provided in a vicinity of the rear end of the guide frame 50 in the longitudinal direction. The fixing hole 542 is provided in a vicinity of the front end of the guide frame 50 in the longitudinal direction. A plurality of fixing holes 543 are provided so as to surround the accommodation portion 53 in a side view in the width direction. The plurality of fixing holes 541 to 543 are portions through which fastening members such as screws and bolts pass when the door driving device 40 is fixed to the vehicle body 20, that is, when the guide frame 50 is fixed to the body panel 22.

<Sub-Cover 60>

As shown in FIGS. 3, 4, and 6, the sub-cover 60 includes a protective plate 61 and a seal 62.

The protective plate 61 has an upper wall 611, an outer wall 612 and an inner wall 613. The upper wall 611 has the same shape as the upper wall 611 of the curved portion 52 of the guide frame 50 when viewed from above. That is, the upper wall 611 has an arc shape when viewed from above. The outer wall 612 extends downward from an outer end of the upper wall 611 in the width direction, and the inner wall 613 extends upward from an inner end of the upper wall 611 in the width direction. A rear end of the outer wall 612 coincides with a rear end of the upper wall 611, and a rear end of the inner wall 613 is located more forward than the rear end of the upper wall 611. Therefore, it can be said that the outer wall 612 extends more rearward than the inner wall 613. The seal 62 is an elastic member made of an elastomer such as rubber and resin. The seal 62 is attached to the inner wall 613 of the sub-cover 60. At this time, the seal 62 is inclined upward from an upper end of the inner wall 613 of the sub-cover 60 as the seal 62 goes inward in the width direction.

The sub-cover 60 is fixed to the curved portion 52 of the guide frame 50 from above. For example, the sub-cover 60 and the guide frame 50 may be fixed using a snap fit or a fastening member such as a bolt. When the sub-cover 60 is fixed to the guide frame 50, the curved portion 52 of the guide frame 50 is covered with the sub-cover 60 from above. At this time, the outer wall 612 of the sub-cover 60 faces the outer guide wall 521 of the curved portion 52 of the guide frame 50. The sub-cover 60 is fixed to the guide frame 50 after the guide frame 50 is fixed to the body panel 22. Therefore, when the sub-cover 60 is fixed to the guide frame 50, the seal 62 is elastically deformed. In this way, the seal 62 fills a gap between the sub-cover 60 and the body panel 22.

<Belt Driving Unit 70>

As shown in FIG. 3, the belt driving unit 70 includes an electric motor 71, an output shaft 72 driven by a power transmitted from the electric motor 71, and a case 73 accommodating components of the belt driving unit 70. The belt driving unit 70 includes a decelerator (not shown) that transmits, to the output shaft 72, the power transmitted from the electric motor 71 inside the case 73. The output shaft 72 is coupled to the driving pulley 81. As shown in FIG. 2, when the door driving device 40 is fixed to the vehicle 10, the belt driving unit 70 is disposed inside the body panel 22.

<Pulley>

As shown in FIG. 4, the driving pulley 81 and the two pressing pulleys 82 and 83 are accommodated in the accommodation portion 53 of the guide frame 50. Specifically, the driving pulley 81 and the two pressing pulleys 82 and 83 are rotatably supported by the accommodation portion 53. At this time, the driving pulley 81 is located between a first pressing pulley 82 and a second pressing pulley 83 in the longitudinal direction of the guide frame 50. Rotation axes of the driving pulley 81, the first pressing pulley 82, and the second pressing pulley 83 extend in the width direction. The driving pulley 81 is a toothed pulley.

As shown in FIGS. 3 and 4, a first driven pulley 84 and a second driven pulley 85 are supported at both ends in the longitudinal direction of the guide frame 50. Specifically, the first driven pulley 84 is rotatably supported by a rear end of the linear portion 51 of the guide frame 50. The second driven pulley 85 is rotatably supported by a front end of the curved portion 52 of the guide frame 50. A third driven pulley 86 is rotatably supported at an intermediate portion of the curved portion 52 of the guide frame 50 in the longitudinal direction. Specifically, the third driven pulley 86 is supported at a position facing the inner guide wall 522 of the curved portion 52 of the guide frame 50 in the width direction. Rotation axes of the three driven pulleys 84 to 86 extend in the upper-lower direction. That is, the rotation axes of the three driven pulleys 84 to 86 are in a positional relation of torsion with the rotation axes of the driving pulley 81, the first pressing pulley 82, and the second pressing pulley 83.

The pulley cover 87 is a member that covers the opening of the accommodation portion 53. The pulley cover 87 has an insertion hole 871 into which the output shaft 72 of the belt driving unit 70 is inserted. By covering the opening of the accommodation portion 53 with the pulley cover 87, the accommodation space 531 of the accommodation portion 53 becomes a closed space. At this time, the pulley cover 87 is preferably flush with the inner wall 515 of the linear portion 51 of the guide frame 50.

<Belt 91 and Belt Bracket 92>

The belt 91 is a toothed belt made of an elastomer such as rubber and resin. The belt 91 is wound around the driving pulley 81, the two pressing pulleys 82 and 83, and the three driven pulleys 84 to 86 in a state where the belt 91 surrounds the guide wall 511 of the linear portion 51 and the outer guide wall 521 and the inner guide wall 522 of the curved portion 52 of the guide frame 50. Here, a portion of the belt 91 wound around the driving pulley 81 is pressed by the two pressing pulleys 82 and 83. In this way, a power from the output shaft 72 of the belt driving unit 70 is efficiently transmitted to the belt 91 via the driving pulley 81.

In the present embodiment, the rotation axes of the driving pulley 81 and the two pressing pulleys 82 and 83 and the rotation axes of the three driven pulleys 84 to 86 have a positional relation of torsion. Therefore, as shown in FIG. 4, the belt 91 is twisted before and after a portion wound around the driving pulley 81 and the two pressing pulleys 82 and 83. Specifically, in the belt 91, torsion is generated between the first pressing pulley 82 and the first driven pulley 84, and torsion is generated between the second pressing pulley 83 and the third driven pulley 86.

As shown in FIG. 5, the belt 91 routed along the linear portion 51 of the guide frame 50 is covered by the main cover 55. The outer upper wall 512 and the inner upper wall 513 of the main cover 55 cover the belt 91 from above. The outer wall 514 and the inner wall 515 of the main cover 55 cover the belt 91 from the width direction. The outer wall 514 and the inner wall 515 of the main cover 55 overlap at least a portion of the belt 91 in the upper-lower direction. In other words, the outer wall 514 and the inner wall 515 of the main cover 55 face the belt 91. At this time, the lower end of the outer wall 514 of the main cover 55 is located at the same height as a lower end of the belt 91 facing the outer wall 514. The lower end of the inner wall 515 of the main cover 55 is located below the lower end of the belt 91 facing the inner wall 515.

As shown in FIG. 6, the belt 91 routed along the curved portion 52 of the guide frame 50 is covered by the upper wall 525 of the curved portion 52 and the sub-cover 60. The upper wall 525 of the curved portion 52 and the upper wall 525 of the sub-cover 60 cover the belt 91 from above. The outer wall 612 of the sub-cover 60 covers the belt 91 from an outside in the width direction. The outer wall 612 of the sub-cover 60 overlaps at least a portion of the belt 91 in the upper-lower direction. At this time, a lower end of the outer wall 612 of the sub-cover 60 is located below the lower end of the belt 91 facing the outer wall 612.

As shown in FIGS. 3 and 4, a base end portion of the belt bracket 92 is coupled to the belt 91, and a distal end portion of the belt bracket 92 is coupled to the center hinge unit 33 of the sliding door 30. In this way, the belt bracket 92 transmits a power output from the belt driving unit 70 to the center hinge unit 33 from the belt 91. The belt bracket 92 is formed by, for example, pressing a metal plate.

<Function of Door Driving Device 40>

The door driving device 40 configured as described above drives the electric motor 71 of the belt driving unit 70 when opening and closing the sliding door 30. Thus, as the output shaft 72 of the belt driving unit 70 rotates, the belt 91 rotates. When the sliding door 30 is opened, the belt 91 is rotated such that the belt bracket 92 moves rearward. As a result, a load acts on the sliding door 30 rearward via the center hinge unit 33. In this way, the sliding door 30 is opened by moving rearward. On the other hand, when the sliding door 30 is closed, the belt 91 is rotated such that the belt bracket 92 moves forward. As a result, a load acts on the sliding door 30 forward via the center hinge unit 33. In this way, the sliding door 30 is closed by moving forward.

Functions of Present Embodiment

Functions in a case where the vehicle 10 gets wet will be described with reference to FIGS. 7 and 8. The case where the vehicle 10 gets wet is, for example, a case where the rainwater falls onto the vehicle 10 and a case where a cleaning liquid is sprayed to the vehicle 10 at the time of washing.

Figure 7:
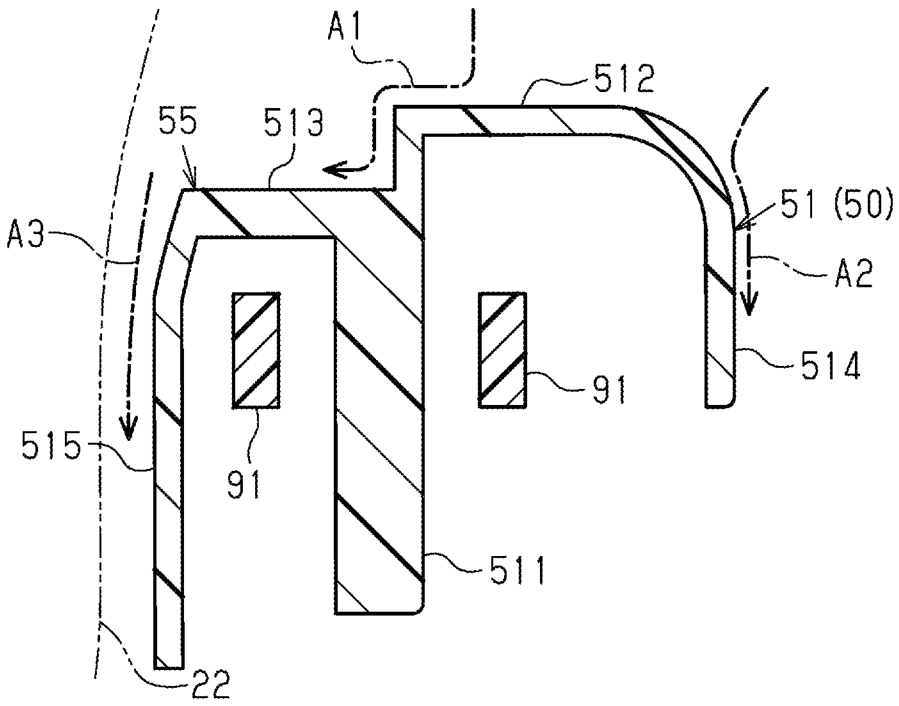
FIG. 7 is an end view of the sliding door driving device orthogonal to the linear portion of the guide frame.

FIG. 7 is a cross-sectional view of the vehicle 10 orthogonal to the longitudinal direction of the linear portion 51 of the guide frame 50. As shown in FIG. 7, the belt 91 routed along the linear portion 51 of the guide frame 50 is covered by the main cover 55. Therefore, a liquid flowing from above toward the belt 91 and the guide wall 511 is blocked by the outer upper wall 512 and the inner upper wall 513 of the main cover 55 as indicated by an arrow A1. In addition, a liquid flowing from a side toward the belt 91 or the like is blocked by the outer wall 514 of the main cover 55 as indicated by an arrow A2. Further, a liquid flowing along the body panel 22 toward the belt 91 or the like is blocked by the inner wall 515 of the main cover 55 as indicated by an arrow A3. Thus, the liquid is prevented from adhering to the belt 91, the guide wall 511, and the like.

Figure 8:
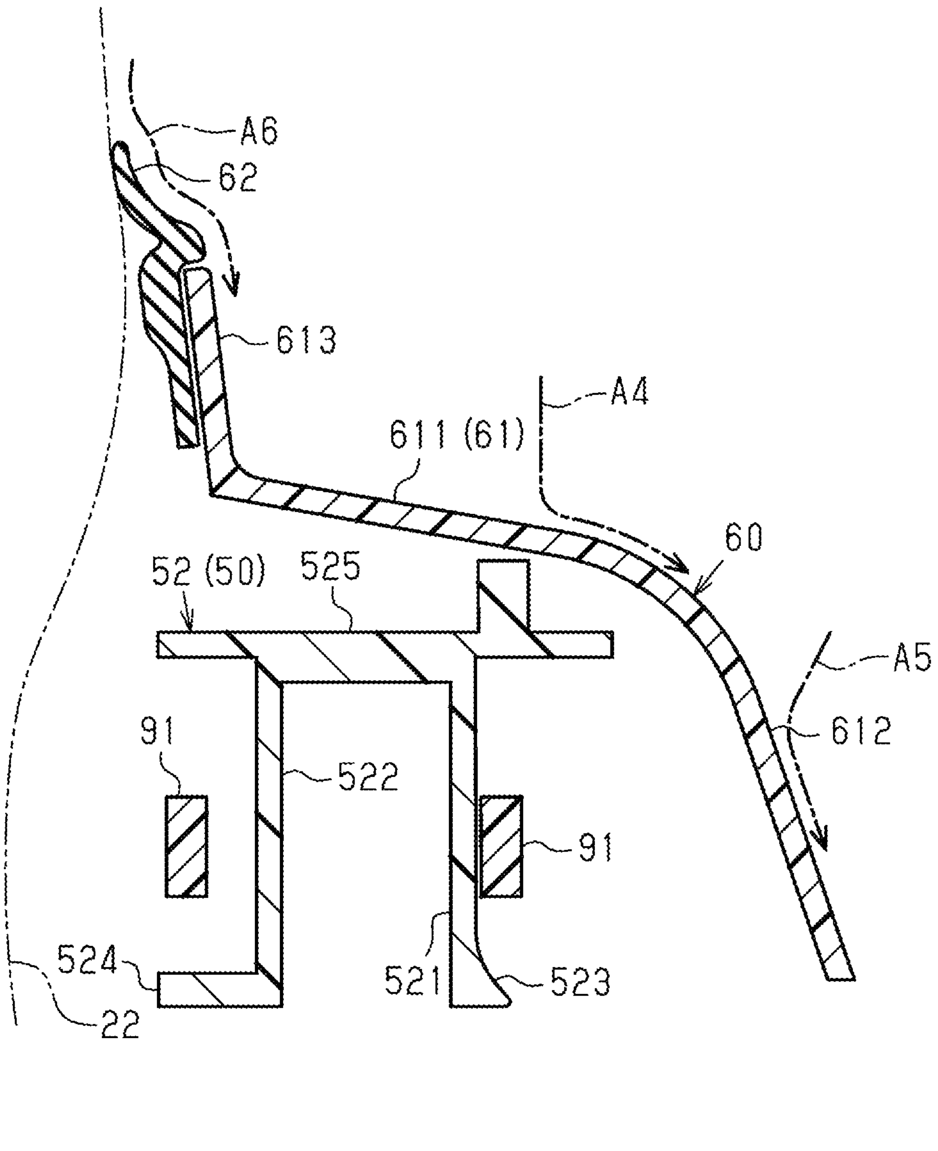
FIG. 8 is an end view of the sliding door driving device orthogonal to the curved portion of the guide frame.

FIG. 8 is a cross-sectional view of the vehicle 10 orthogonal to the longitudinal direction of the curved portion 52 of the guide frame 50. As shown in FIG. 8, the belt 91 routed along the curved portion 52 of the guide frame 50 is covered by the sub-cover 60. Therefore, a liquid flowing from above toward the belt 91, outer guide wall 521, and inner guide wall 522 is blocked by the upper wall 525 of the sub-cover 60 as indicated by an arrow A4. In addition, a liquid flowing from a side toward the belt 91 or the like is blocked by the outer wall 612 of the sub-cover 60 as indicated by an arrow A5. Further, a liquid flowing along the body panel 22 toward the belt 91 or the like is blocked by the seal 62 of the sub-cover 60 as indicated by an arrow A6. Thus, the liquid is prevented from adhering to the belt 91, the outer guide wall 521, the inner guide wall 522, and the like.

Effects of Present Embodiment (1) The sliding door driving device 40 includes the main cover 55 having the outer upper wall 512, the inner upper wall 513, the outer wall 514, and the inner wall 515. Thus, even when a liquid is splashed on the vehicle 10, the liquid is less likely to reach the belt 91 and a peripheral configuration of the belt 91. Therefore, the door driving device 40 can prevent the liquid from adhering to the belt 91 or the like. As a result, it is possible to avoid a problem that occurs when the liquid adheres to the belt 91 or the like. For example, it is possible to prevent the belt 91 from becoming stuck with respect to the guide frame 50 due to freezing of the liquid adhering to the belt 91. That is, it is possible to prevent the door driving device 40 from being unable to open and close the sliding door 30.

(2) The outer wall 514 and the inner wall 515 of the main cover 55 overlap at least a portion of the belt 91 in the upper-lower direction. Therefore, the door driving device 40 can further prevent the liquid from adhering to the belt 91 or the like.

(3) A power for opening and closing the sliding door 30 is transmitted to the sliding door 30 via the belt bracket 92 that connects the belt 91 and the sliding door 30. When the belt 91 is driven, the belt bracket 92 moves below the outer wall 514 of the main cover 55 along the longitudinal direction of the guide frame 50. Therefore, the outer wall 514 of the main cover 55 needs to avoid interference with the belt bracket 92. On the other hand, it is not necessary to consider interference between the inner wall 515 of the main cover 55 and the belt bracket 92. In this regard, in the door driving device 40, the lower end of the inner wall 515 is located below the lower end of the outer wall 514. Therefore, the door driving device 40 can prevent the liquid flowing inside the device from reaching the belt 91 or the like while avoiding interference between the belt bracket 92 and the outer wall 514 of the main cover 55.

(4) In the door driving device 40, since the main cover 55 is formed integrally with the guide frame 50, the number of components constituting the device can be reduced.

(5) The curved portion 52 of the guide frame 50 is curved unlike the linear portion 51. Therefore, a cover that covers the belt 91 routed along the curved portion 52 may not be formed integrally with the curved portion 52. For example, as shown in FIG. 6, the curved portion 52 of the guide frame 50 has the outer bottom wall 523 and the inner bottom wall 524 for preventing the belt 91 from falling off. In this case, when the guide frame 50 is resin molded, a side wall extending downward from the upper wall 525 cannot be provided due to a restriction in a mold-releasing direction. In this respect, in the door driving device 40, the main cover 55 that covers the belt 91 routed along the linear portion 51 of the guide frame 50 is formed integrally with the guide frame 50. On the other hand, the sub-cover 60 that covers the belt 91 routed along the curved portion 52 of the guide frame 50 is formed separately from the guide frame 50. Therefore, the sliding door driving device 40 can prevent the liquid from adhering to the belt 91 routed along the curved portion 52 or the like while reducing the number of components constituting the device. The door driving device 40 can reduce a size of a cover that is formed separately from the guide frame 50.

(6) In the door driving device 40, the gap between the sub-cover 60 and the body panel 22 is sealed with the seal 62, so that the liquid can be prevented from passing through the gap between the sub-cover 60 and the body panel 22. In this way, the door driving device 40 can prevent the liquid from passing through the gap between the sub-cover 60 and the body panel 22, and adhering to the belt 91 or the like.

Modifications

The present embodiment can be modified and implemented as follows. The present embodiment and the following modifications can be implemented in combination with each other within a range that the embodiment and the modifications do not technically contradict each other.

- The guide frame 50 may include only the linear portion 51. In this case, the linear portion 51 may be gently curved such that the front end thereof is located inward of a rear end thereof in the width direction.
- The main cover 55 may be formed separately from the guide frame 50. In this case, the main cover 55 and the sub-cover 60 may be formed integrally or separately.
- The sub-cover 60 may not be fixed to the guide frame 50 from above. For example, the sub-cover 60 may be fixed to the guide frame 50 inward from an outer side in the width direction.
- The seal 62 may be omitted from the sub-cover 60. In this case, the sub-cover 60 may have a configuration corresponding to the inner wall 515 of the main cover 55. That is, the sub-cover 60 may have an inner wall extending downward from the inner end of the upper wall 611 in the width direction. Further, the inner wall may have a length that allows the inner wall to face the belt 91 routed along the curved portion 52 of the guide frame 50.
- In the sub-cover 60, the seal 62 may be replaced with a water-stopping tape attached across the body panel 22 and the protective plate 61 so as to seal a gap between the body panel 22 and the protective plate 61.
- Lengths of the outer wall 514 and the inner wall 515 of the main cover 55 may be appropriately adjusted. For example, the outer wall 514 of the main cover 55 only needs to extend slightly downward from an outer end of the outer upper wall 512, and the inner wall 515 of the main cover 55 only needs to extend slightly downward from an inner end of the inner upper wall 513. At this time, in a side view in the width direction, the belt 91 routed along the linear portion 51 of the guide frame 50 may not be hidden by the outer wall 514 and the inner wall 515.
- In the door driving device 40, the guide frame 50 may not be an integrally molded product made of a resin material. For example, the linear portion 51 and the curved portion 52 may be formed separately.
- The door driving device 40 may be installed at a position aligned with the upper rail 23 in the upper-lower direction. In this case, the belt bracket 92 of the door driving device 40 is coupled to the upper hinge unit 32. The door driving device 40 may be installed at a position aligned with the lower rail 25 in the upper-lower direction. In this case, the belt bracket 92 of the door driving device 40 is coupled to the lower hinge unit 34.
- The belt driving unit 70 may be assembled to the guide frame 50 such that an axial direction of the output shaft 72 of the belt driving unit 70 is aligned with the same direction as axial directions of the three driven pulleys 84 to 86. According to this configuration, the belt 91 can be prevented from being twisted.

Hereinafter, a method for solving the problem of the related art and functions and effects thereof will be described.

According to an aspect of this disclosure, a sliding door driving device that is fixed to a body panel of a vehicle and operates a sliding door of the vehicle in an opening direction and a closing direction includes: an elongated guide frame; a first driven pulley and a second driven pulley that are rotatably supported at both ends in a longitudinal direction of the guide frame; a belt that is wound around the first driven pulley and the second driven pulley; and a cover that covers the belt. The cover has an upper wall that covers the belt from above, an outer wall that extends downward from an outer end of the upper wall in a width direction of the vehicle, and an inner wall that extends downward from an inner end of the upper wall in the width direction.

The sliding door driving device includes a cover having the upper wall, the outer wall, and the inner wall. Thus, even when a liquid such as rain water or cleaning water is splashed on the sliding door driving device, the liquid is less likely to reach the belt and a peripheral configuration of the belt. Therefore, the sliding door driving device can prevent the liquid from adhering to the belt and the peripheral configuration of the belt.

In the sliding door driving device, the outer wall and the inner wall may overlap at least a part of the belt in an upper-lower direction of the vehicle.

The sliding door driving device can further prevent the liquid from adhering to the belt or the like.

In the sliding door driving device, a lower end of the inner wall may be located lower than a lower end of the outer wall.

A power for opening and closing the sliding door is transmitted to the sliding door via a belt bracket that connects the belt and the sliding door. When the belt is driven, the belt bracket moves below the outer wall of the cover along a longitudinal direction of the guide frame. Therefore, it is necessary to avoid interference between the outer wall of the cover and the belt bracket. On the other hand, it is not necessary to consider interference between the inner wall of the cover and the belt bracket. In this regard, in the sliding door driving device having the above-described configuration, the lower end of the inner wall is located below the lower end of the outer wall of the cover. Therefore, in the sliding door driving device, it is easy to prevent the liquid flowing inside the device from reaching the belt or the like while avoiding the interference between the belt bracket and the outer wall of the cover.

In the sliding door driving device, the cover may be formed integrally with the guide frame.

Since the cover and the guide frame can be formed integrally, the number of components constituting the sliding door driving device can be reduced.

In the sliding door driving device, the guide frame may include a linear portion extending linearly in the closing direction, and a curved portion curved inward in the width direction from an end portion of the linear portion in the closing direction toward the closing direction, the cover may be a main cover that covers the belt routed along the linear portion of the guide frame, and the sliding door driving device may include a sub-cover formed separately from the guide frame and covering the belt routed along the curved portion of the guide frame.

Since the curved portion of the guide frame is curved unlike the linear portion, it may be difficult to integrate the curved portion with the main cover. Therefore, according to the above configuration, the main cover that covers the belt routed along the linear portion of the guide frame is formed integrally with the guide frame. On the other hand, the sub-cover that covers the belt routed along the curved portion of the guide frame is formed separately from the guide frame. Therefore, the sliding door driving device can prevent the liquid from adhering to the belt routed along the curved portion or the like while reducing the number of components constituting the device.

In the sliding door driving device, the sub-cover may include a seal that seals a gap between the sub-cover and the body panel.

In the sliding door driving device, the gap between the sub-cover and the body panel is sealed with the seal, so that the liquid is prevented from passing through the gap between the sub-cover and the body panel. In this way, the sliding door driving device can prevent the liquid from passing through the gap between the sub-cover and the body panel and adhering to the belt or the like.

The sliding door driving device can prevent the liquid from adhering to the belt and the peripheral configuration of the belt.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A sliding door driving device that is fixed to a body panel of a vehicle and operates a sliding door of the vehicle in an opening direction and a closing direction, the sliding door driving device comprising:
- an elongated guide frame;
- a first driven pulley and a second driven pulley that are rotatably supported by the guide frame at both ends in a longitudinal direction of the guide frame;
- a driving pulley rotatably supported in an accommodation portion of the guide frame in between the first driven pulley and the second driven pulley;
- a belt that is wound around the driving pulley, the first driven pulley, and the second driven pulley; and
- a cover that covers the belt, the cover including an upper wall that covers the belt from above, an outer wall that extends downward from an outer end of the upper wall in a width direction of the vehicle, a guide wall that extends downward from a middle portion of the upper wall, and an inner wall that extends downward from an inner end of the upper wall in the width direction,
- wherein the upper wall includes an inner upper wall and an outer upper wall that each cover the belt from above on either side of the guide wall, and
- the inner upper wall and the inner wall form a space in which the belt is routed.

2. The sliding door driving device according to claim 1, wherein
- lower ends of the outer wall and the inner wall are located lower than an upper end of the belt.

3. The sliding door driving device according to claim 2, wherein
- the lower end of the inner wall is located lower than the lower end of the outer wall.

4. The sliding door driving device according to claim 3, wherein
- the cover is formed integrally with the guide frame.

5. The sliding door driving device according to claim 4, wherein
- the guide frame includes a linear portion extending linearly in the closing direction, and a curved portion curved inward in the width direction from an end portion of the linear portion in the closing direction toward the closing direction, the cover is a main cover that covers the belt routed along the linear portion of the guide frame, and the sliding door driving device includes:

a sub-cover formed separately from the guide frame and covering the belt routed along the curved portion of the guide frame.

6. The sliding door driving device according to claim 5, wherein the sub-cover includes a seal that seals a gap between the sub-cover and the body panel.

7. The sliding door driving device according to claim 2, wherein the cover is formed integrally with the guide frame.

8. The sliding door driving device according to claim 7, wherein the guide frame includes a linear portion extending linearly in the closing direction, and a curved portion curved inward in the width direction from an end portion of the linear portion in the closing direction toward the closing direction, the cover is a main cover that covers the belt routed along the linear portion of the guide frame, and the sliding door driving device includes:

a sub-cover formed separately from the guide frame and covering the belt routed along the curved portion of the guide frame.

9. The sliding door driving device according to claim 8, wherein the sub-cover includes a seal that seals a gap between the sub-cover and the body panel.

10. The sliding door driving device according to claim 1, wherein the cover is formed integrally with the guide frame.

11. The sliding door driving device according to claim 10, wherein the guide frame includes a linear portion extending linearly in the closing direction, and a curved portion curved inward in the width direction from an end portion of the linear portion in the closing direction toward the closing direction, the cover is a main cover that covers the belt routed along the linear portion of the guide frame, and the sliding door driving device includes:

a sub-cover formed separately from the guide frame and covering the belt routed along the curved portion of the guide frame.

12. The sliding door driving device according to claim 11, wherein the sub-cover includes a seal that seals a gap between the sub-cover and the body panel.

13. The sliding door driving device according to claim 1, further comprising:

a pulley cover that covers and encloses the accommodation portion of the guide frame.

* * * * *